Patented Aug. 4, 1925.

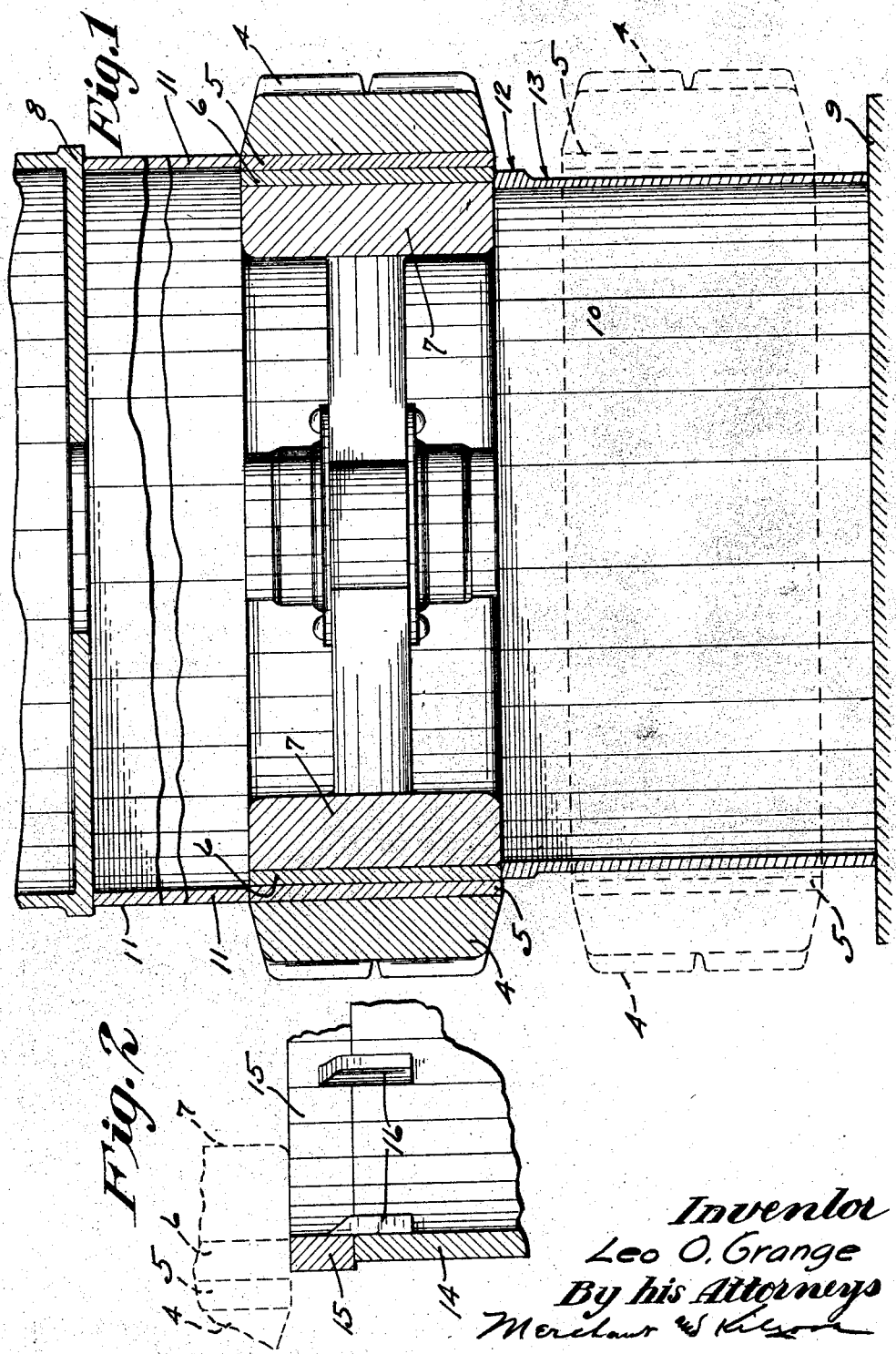

1,548,136

UNITED STATES PATENT OFFICE.

LEO O. GRANGE, OF MINNEAPOLIS, MINNESOTA.

MEANS FOR REMOVING SOLID TIRES FROM WHEELS.

Application filed July 28, 1924. Serial No. 728,615.

*To all whom it may concern:*

Be it known that I, LEO O. GRANGE, a citizen of the United States, residing at Minneapolis, in the county of Hennepin and State of Minnesota, have invented certain new and useful Improvements in Means for Removing Solid Tires from Wheels; and I do hereby declare the following to be a full, clear, and exact description of the invention, such as will enable others skilled in the art to which it appertains to make and use the same.

My present invention relates to means for removing solid tires from wheels, and has for its object to improve the same as will hereinafter appear.

As is well known, solid tires are permanently secured to metallic bands and are mounted on truck or other wheels by pressing the tire band axially onto the felly bands of the wheels by means of a hydraulic press or other means. For removing one of these tires, when worn out, from a wheel, said wheel, after being removed from a vehicle is placed on a lower ring of such size as to directly support the felly band of the wheel and having an external diameter that is slightly less than that of said felly band. A second ring is placed on top of the wheel and is of such size as to directly rest on the tire band and having an internal diameter that is slightly greater than that of said tire band. The lower ring is placed on the lowered piston of a hyraulic press, then the wheel is placed thereon, and the upper ring is placed on said wheel, or in some instances the lower ring may be placed on a truck and wheeled onto the lowered piston after the wheel and upper ring have been properly positioned.

The press is then operated to raise the piston and thereby bring the upper ring into contact with the platen of the press as a base of resistance. A continued movement of the piston will cause the lower ring to lift the felly band of the wheel carried thereby while the tire band is held stationary by the upper ring reacting against the platen and press said felly band out of the tire band. During the lifting movement of the felly band, the lower ring enters the tire band and extends completely therethrough at the time the tire band is removed from the felly band.

As previously stated, the external diameter of the lower ring is only slightly less than that of the felly band and hence if the tire band is perfectly true, the same can be easily removed from the lower ring after the upper ring is removed from the wheel and the wheel from said lower ring by lifting said lower ring out of the tire band; but many bands of old solid tires are either out of true or so badly dented by use that when pressed from a felly band onto the lower ring, they engage the same with such friction that it is necessary to use a sledge or other tool to drive the tire band from the lower ring, which is not only very laborious but takes considerable time.

By the use of my invention the lower ring may be easily lifted from the removed tire band.

In the accompanying drawings, which illustrate the invention, like characters indicate like parts throughout the several views.

Referring to the drawings:

Fig. 1 is a fragmentary view principally in central vertical section illustrating the invention as used in connection with a hydraulic press to remove a tire-equipped band from the felly of a wheel, some parts being illustrated in different positions by means of broken lines; and Fig. 2 is a fragmentary view illustrating a modified form of the invention and also illustrating by means of broken lines a portion of a tire and its band.

In the drawings there is illustrated a solid tire 4 permanently secured to a metallic band 5 which is secured to the felly band 6 of a truck wheel 7, of the artillery type, in the customary manner by pressing said tire band axially onto the felly band by the use of a hydraulic press or other means.

Referring first to the invention as illustrated in Fig. 1, the numerals 8 and 9 indicate, respectively, the platen and piston of a hydraulic press located, the former above the latter, and said piston, when lowered, will be substantially at the floor level. Cooperating with the hydraulic press is a lower ring 10 and an upper ring 11 adapted to be placed in axial alignment between the platen and piston of said hydraulic press, and the former of said rings is the subject matter of my present invention.

The lower ring 10 rests on the piston 9 and supports the wheel 7 from which the tire 4 is to be removed. This lower ring is of such size as to directly engage the felly band 6 and the upper ring 11 is of such size as to directly rest upon the tire band 5 and be brought into direct engagement with the platen 8 when the piston 9 is raised. The lower ring 10, as shown, has two external diameters, as indicated at 12 and 13, the former of which is greatest and is at the upper edge portion thereof, or in other words, at the felly band-engaging portion of said ring, and the width thereof is relatively narrow. The smaller diameter 13 of the ring extends to the lower edge thereof and is relatively wide and must have a width greater than that of the tire band 5. The ring 10 at its greatest external diameter 12 is slightly less than that of the external diameter of the felly band 6, and the internal diameter of the ring 11 is slightly greater than that of the tire band 5.

At the time the rings and wheel are assembled on the piston 9 there is considerable clearance between the upper ring 11 and the platen 8, but in the drawings, said piston has been raised sufficiently to bring the ring 11 into contact with the platen 8 as a base of resistance to hold the tire band 6. A further lifting movement of the piston 9 will cause the lower ring 10 to lift the felly band 6 and thereby move the same axially out of the tire band 5 and telescope the same loosely into said upper ring 11. This lifting movement of the felly band 6 telescopes the lower ring 10 into the tire band 5 and forces the same at its greatest diameter 12 completely through said tire band so that said tire band is free to drop onto the piston 9 and loosely surround the ring 10 at its smallest diameter 13. It will thus be seen that in case the tire band 5 is out of true and tends to stick on the ring 10 at its greatest diameter 12, the same will be positively forced thereover under the action of the press.

The piston 9 is then lowered and the upper ring and the wheel removed, and the lower ring 10 lifted from the removed tire band 5.

It is of course understood that the rings 10 and 11 will have to be furnished in different sizes for different sized wheels. In place of assembling the rings and wheels on the piston of a press, the same may be assembled on a truck and the truck wheeled onto the piston, which is the preferred way of handling the same. In place of making the lower ring with two diameters as shown in Fig. 1, the same may be externally tapered from its felly band-engaging end toward its other end.

Referring now to the invention shown in Fig. 2, there is illustrated a slight modification of the lower ring. In this structure the ring 14 has a removable upper section 15 for engagement with a tire band, and which upper section has a greater external diameter than the ring proper. This upper ring section 15 is held in place on the ring proper by forming therewith a plurality of depending circumferentially spaced lugs 16 which engage the inner surface of the ring 14.

What I claim is:

1. A ring for use in connection with a hydraulic press or other means for removing a tire band from the felly band of a wheel, said ring being adapted at one of its ends to engage said felly band and having a reduced external diameter extending away from its felly band-engaging end and around which reduced portion of the ring said tire band will loosely extend when removed from said felly band.

2. A ring for use in removing a tire band from the felly band of a wheel having a removable end section engageable with said felly band, the ring proper being of less external diameter than its removable section to loosely receive therearound the tire band when removed from the felly band.

In testimony whereof I affix my signature.

LEO O. GRANGE.